(12) United States Patent
Goto et al.

(10) Patent No.: US 6,595,337 B2
(45) Date of Patent: Jul. 22, 2003

(54) FOR TWO-WAY ROLLER CLUTCH ASSEMBLY

(75) Inventors: Shiro Goto, Ann Arbor, MI (US); Russell E. Monahan, Ann Arbor, MI (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/908,402

(22) Filed: Jul. 18, 2001

(65) Prior Publication Data
US 2002/0019286 A1 Feb. 14, 2002

Related U.S. Application Data
(60) Provisional application No. 60/223,882, filed on Aug. 8, 2000.

(51) Int. Cl.[7] ............................................. F16D 27/108
(52) U.S. Cl. .......................... 192/84.8; 192/38; 192/40; 475/239
(58) Field of Search ................................. 475/231, 237, 475/238, 239; 192/38, 84.8, 35, 47, 40, 113.36

(56) References Cited

U.S. PATENT DOCUMENTS

| 3,448,636 A | * | 6/1969 | Roper et al. ............ 475/231 X |
| 5,279,401 A | * | 1/1994 | Stall ....................... 475/231 X |
| 5,286,239 A | * | 2/1994 | Ito et al. ..................... 475/231 |
| 5,366,421 A | * | 11/1994 | Hirota .......................... 475/231 |
| 5,682,971 A | * | 11/1997 | Takakura et al. ... 192/113.36 X |
| 5,776,288 A | * | 7/1998 | Stefanutti et al. ... 192/113.36 X |
| 5,924,510 A | | 7/1999 | Itoh et al. |
| 5,927,456 A | | 7/1999 | Monahan et al. |

FOREIGN PATENT DOCUMENTS

JP 406058378 * 3/1994 ................. 475/231

* cited by examiner

Primary Examiner—Charles A. Marmor
Assistant Examiner—Ha Ho
(74) Attorney, Agent, or Firm—Brinks Hofer Gilson & Lione

(57) ABSTRACT

An over-running clutch assembly comprises an outer race having a cylindrical inner surface and an inner race having a cammed outer surface coaxial with the cylindrical inner surface and defining a gap therebetween and a roller clutch disposed within the gap; a biasing element to bias the roller clutch to a disengaged position; and an actuator to selectively overcome the biasing element to engage the roller clutch and lock the outer race and inner race and prevent relative rotation between the outer race and inner race.

8 Claims, 5 Drawing Sheets

FOR TWO-WAY ROLLER CLUTCH ASSEMBLY

CROSS REFERENCE TO RELATED APPLICATIONS

This application claims the benefit of related provisional application Ser. No. 60/223,882 filed Aug. 8, 2000.

TECHNICAL FILED OF THE INVENTION

This invention is related to a two way over-running clutch, preferably for use in automotive differential applications. More specifically, the present invention relates to a two-way over-running clutch assembly of a roller/ramp variety which can be controlled for selectively locking up an automotive differential assembly.

BACKGROUND OF THE INVENTION

This invention is related to devices and methods as described in United States Provisional Application No.: 60/223,882, filed Aug. 8, 2000, and United States Provisional Application No.: 60/258,383, filed Dec. 27, 2000, all of which are commonly assigned.

Differential assemblies are used in motor vehicles to allow the wheels to turn at different rotational speeds while still providing power to the wheels. Various types of differential assemblies are used in motor vehicles to redirect the transfer of power to the driving axles.

In a standard differential, as a vehicle turns, power continues to be provided through pinion and ring gears to the differential housing. As the inner and outer wheels describe different circles or radii, side gears attached to axle shafts are allowed to turn at different speeds by the motion of intermediate spider gears. As long traction is maintained between the drive wheels and the road service, the power is properly distributed to the wheels through the differential assembly. However, when traction is reduced or lost altogether, a standard differential assembly will spin uselessly, providing little tractive power to the wheels. For instance, if one tire is on ice or some other slippery service while the other is on dry pavement, slip will occur at the low friction side and all the power through the differential assembly will be sent to the slipping tire. No power will be delivered to the wheel on the dry pavement and the vehicle will not be powered forward or backward. Therefore, there is a need to lock the axle halves together in certain situations.

A differential assembly design that is used to overcome the shortcomings of the standard differential assembly is known as the locking differential. A locking differential typically engages a "dog" clutch or an axial gear set to lock the two axle halves together. Unfortunately, locking differentials cannot be engaged "on-the-fly" because any relative motion between the gear teeth would result in severe mechanical damage. It would be desirable to selectively lock the differential assembly instantaneously during "on-the-fly" operation.

It is known in the art to selectively lock other drivetrain components using roller/ramp clutch assemblies. For example, the two-way over-running clutch assembly described in U.S. Pat. No. 5,927,456, assigned to NTN Corporation, and hereby incorporated by reference, describes a clutch assembly of a roller ramp variety and the mechanism by which the rollers are retained and biased in the assembly. In addition, the rotation transmission device described in U.S. Pat. No. 5,924,510, also assigned to NTN Corporation, and hereby incorporated by reference, discloses a device which includes a clutch assembly mounted in the transfer case of a four-wheel drive vehicle that can selectively transmit a driving force.

It would be desirable to provide this technology for use with differential assemblies to selectively lock the two axle halves together during "on-the-fly" operation.

A primary object of this invention is therefore to provide a two-way over-running clutch mechanism, such as that disclosed in U.S. Pat. No. 5,927,456 or U.S. Pat. No. 5,924,510, installed in the differential assembly of a motor vehicle which when energized will lock together a side gear or drive axle and the differential housing so that no relative rotation can occur between the two drive wheels. This system will provide on-demand traction and can be controlled by an electromagnetic trigger clutch or by hydraulic, pneumatic or other means.

Another object of the present invention is to provide a differential assembly which can be selectively locked together instantaneously during "on-the-fly" operation.

BRIEF SUMMARY OF THE INVENTION

In accordance with an aspect of the present invention an over-running clutch assembly comprises an outer race having a cylindrical inner surface and being rotatable about an axis and a case end enclosing a first end of the outer race, an inner race having a segmented (flat or slightly concave) outer surface coaxial with the cylindrical inner surface and defining a gap therebetween. The inner race is rotatable about the axis with rotational movement relative to the outer race. A plurality of ramp surfaces formed at spaced apart locations on the outer surface define a plurality of cammed surfaces on the outer surface of the inner race. A plurality of rollers are positioned between the outer race and the inner race with one of the rollers being located centrally within each of the cammed surfaces and each of the rollers having a diameter less than the gap between the center of the cammed surface on the inner race and the cylindrical inner surface of the outer race. A retainer interconnects all of the rollers and causes the rollers to circumferentially move in unison with one another. The retainer is rotatable about the axis with limited relative rotation with respect to the inner race. A first biasing element is supported on the retainer to radially bias the retainer position relative to the inner race such that each of the rollers is held in the center of the flat cammed surfaces on the inner race. An actuation disk is connected to the retainer by a means which allows some axial movement of the activation disk with respect to the retainer toward the case end. The preferred method would include a retainer tab extending axially from one end of the retainer and a notch which is adapted to engage the retainer tab thereby preventing circumferential or relative rotational motion of the actuation disk relative to the retainer and allowing axial motion of the actuation disk relative to the retainer. A second biasing element is disposed between the actuation disk and the inner axial surface of the case end to bias the actuation disk away from the case end.

The clutch assembly includes an actuator to selectively overcome the second biasing element to force the actuation disk into contact with the case end, wherein rotation of the outer race and case end with respect to said inner race is frictionally transferred to the actuation disk and the retainer, overcoming the first biasing element, thereby moving the rollers along the ramp surfaces to a position where the rollers engage and wedge between the inner and outer races to prevent relative rotation between the inner and outer races.

DETAILED DESCRIPTION OF THE INVENTION

The following description of the preferred embodiment of the invention is not intended to limit the scope of the invention to this preferred embodiment, but rather to enable any person skilled in the art to make and use the invention.

Figure 1:
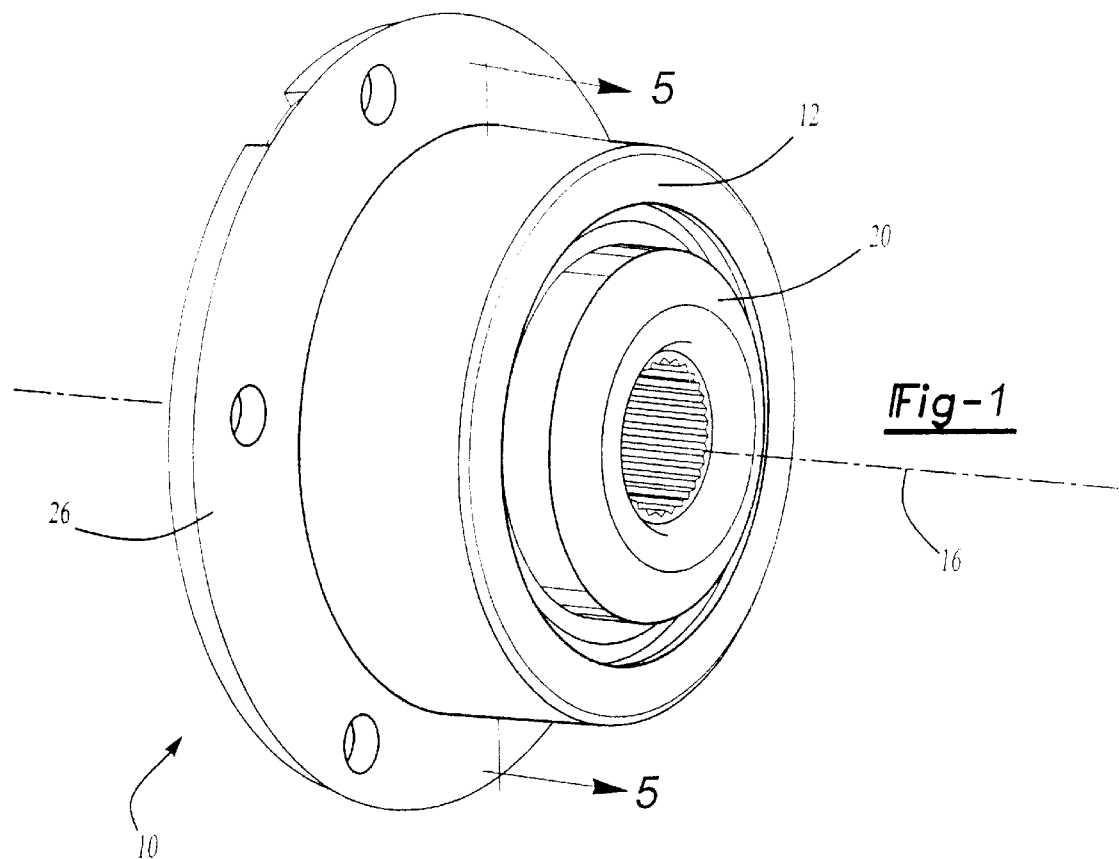
FIG. 1 is a perspective view of an over-running clutch of the present invention.
Figure 3:
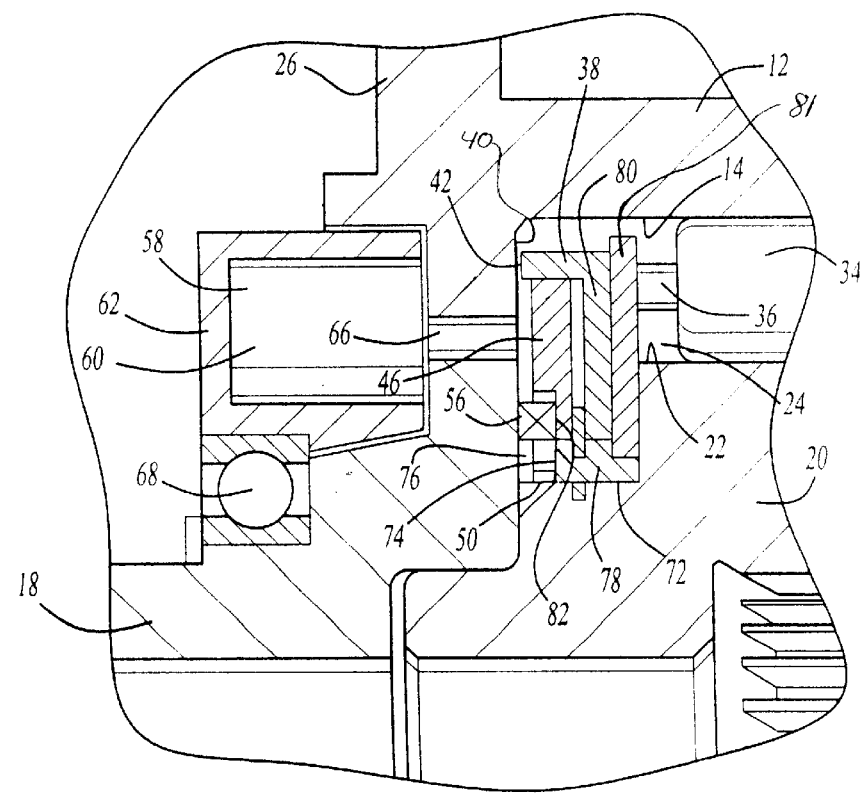
FIG. 3 is a detail of a portion of the over-running clutch of FIG. 2.
Figure 2:
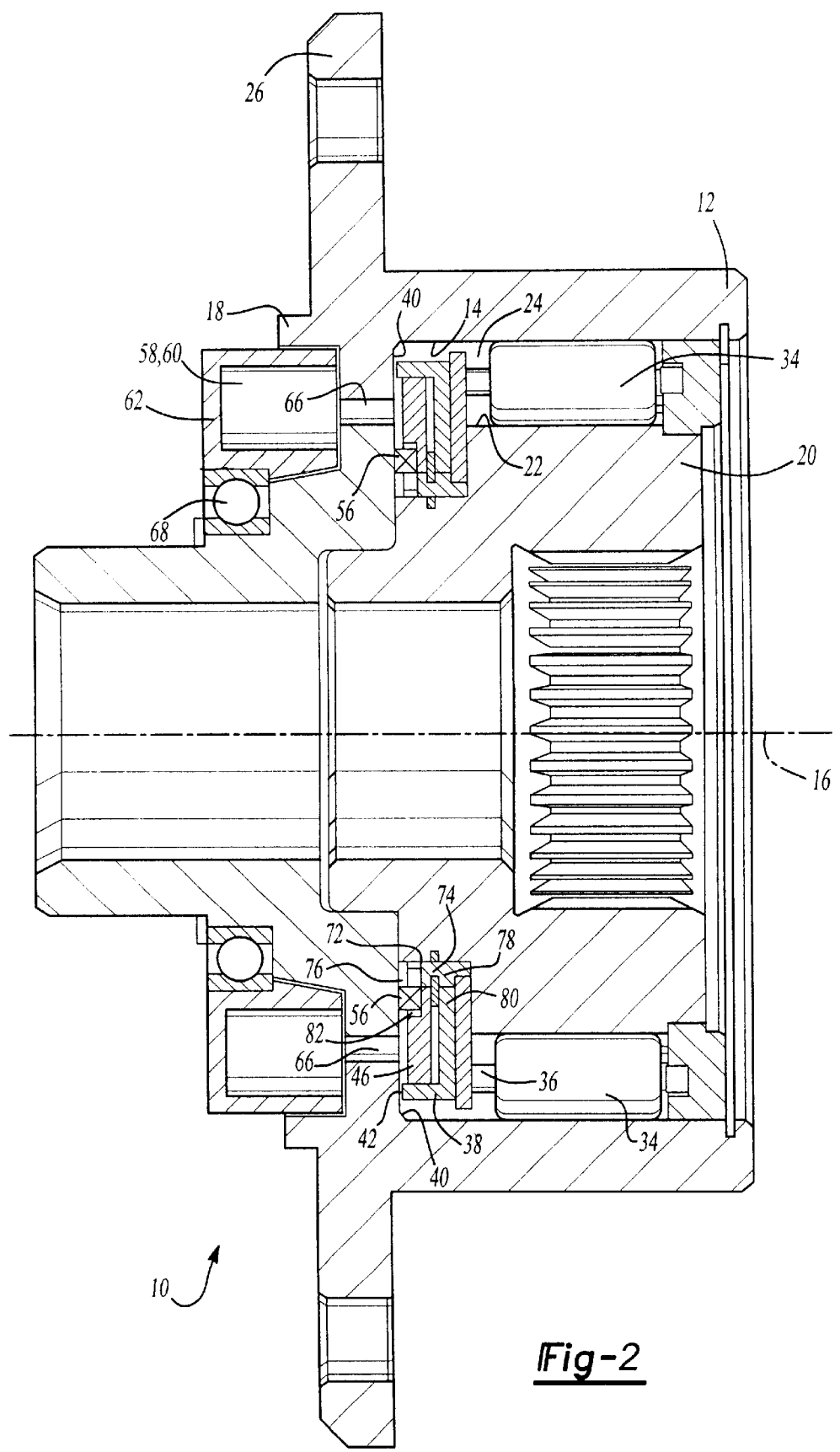
FIG. 2 is a side sectional view of the over-running clutch of FIG. 1.

Referring to FIGS. 1–3, an over-running clutch assembly of the present invention is shown generally at 10. The clutch assembly 10 includes an outer race 12 having a cylindrical inner surface 14 and is rotatable about an axis 16. The outer race 12 includes a case end 18 enclosing a first end of the outer race 12. The clutch assembly 10 also includes an inner race 20 having a cammed outer surface 22 coaxial with the cylindrical inner surface 14 of the outer race 12. The inner surface 14 of the outer race 12 and the outer surface 22 of the inner race 20 define a gap 24 between the inner race 20 and the outer race 12. The inner race 20 is rotatable about the axis 16. The outer race 12 includes a flange 26 or other means for mounting the clutch assembly 10 to a differential housing 28. Preferably, the rollers 34, the inner race 20 and the outer race 12 are made from steel. Due to the high hertzian contact stresses experienced by the rollers 34, the inner surface 14 of the outer race 12 and the outer surface 22 of the inner race 20, the inner surface 14 and outer surface 22 are preferably hardened and ground.

The outer surface 22 of the inner race 20 includes a plurality of ramp surfaces formed at spaced apart locations which define a plurality of cammed surfaces on the outer surface 22 of the inner race 20. A plurality of rolling elements 34 are positioned between the outer race 12 and the inner race 20 with one roller 34 being located at the center of each of the cammed surfaces of the inner race. The rolling elements 34 have a diameter which is smaller than the gap 24 between the inner surface 14 and the midpoint of the cammed outer surface 22, but greater than the gap between the outer portions of the cammed surfaces and the inner surface 14. A retainer 36 interconnects all of the rolling elements 34 and causes the rolling elements 34 to circumferentially move in unison with one another. The retainer 36 is rotatable about the axis 16 with limited relative rotation with respect to the inner race 20. The retainer 36 also includes a retainer tab 38 extending axially toward an inner surface 40 of the case end 18. A distal end 42 of the retainer tab 38 is adjacent the inner surface 40 of the case end 18.

A first biasing element 81 is mounted onto the retainer 36 to maintain the position of the retainer with respect to the inner race such that the rollers are normally held in the middle of the cammed surfaces. An actuation disk 46 is disposed between the retainer 36 and the inner surface 40 of the case end 18. The actuation disk 46 has an outer diameter 48 and an inner diameter 50. The actuation disk 46 further includes a notch 54 located radially about the outer diameter 48. The notch 54 is adapted to engage the retainer tab 38 thereby preventing rotational motion of the actuation disk 46 relative to the retainer 36, while allowing axial motion of the actuation disk 46 relative to the retainer 36. A second biasing element 56 is disposed between the actuation disk 46 and the inner surface 40 of the case end 18 to bias the actuation disk 46 away from the case end 18 and toward the retainer 36. Preferably, the second biasing element 56 is a wave spring.

In the preferred embodiment, the first biasing element is a centering spring supported by the retainer 36 and engaging the inner race 20 to keep the retainer in position to keep the rolling elements 34 in the center of the cammed surfaces of the inner race 20 to allow the outer race 12 and the inner race 20 to rotate freely with respect to each other. The centering spring includes a plurality of small tangs (not shown) extending radially in or out to engage small notches (not shown) on the hub 72 of the inner race 20. The biasing force of the centering spring must be carefully calibrated for the clutch assembly 10. The centering spring must provide enough force to move the retainer 36 and rolling elements 34 to the neutral position easily when the clutch assembly 10 is disengaged, but not so much force that the friction between the actuation disk 46 and the case end 18 cannot overcome it to actuate the clutch assembly 10.

Figure 4:
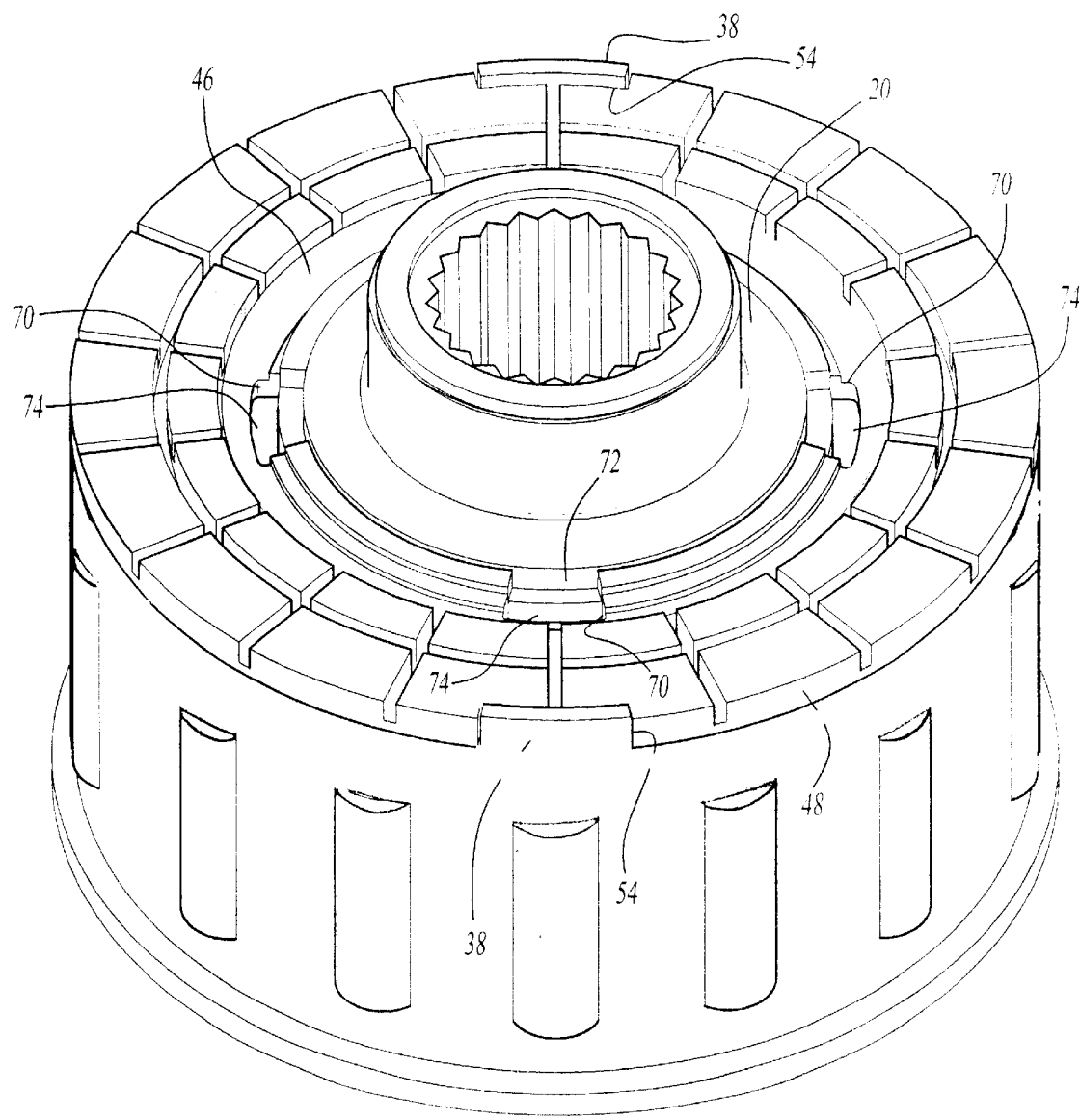
FIG. 4 is perspective view of the assembly of the inner race, the retainer, the rollers and the actuation disk for the over-running clutch.

Referring to FIG. 4, the actuation disk 46 may further include grooves milled into one face to assist the displacement of lubricant, especially at low temperatures when the viscosity can increase to such levels that actuation is impaired. These grooves can be radial or circumferential, or even spiral in both directions to assist the "corkscrewing" of the thickened lubricant out of the interface zone as the parts rotate relative to each other.

The clutch assembly 10 includes an actuator 58 to selectively overcome the second biasing element 56 to force the actuation disk 46 into contact with the case end 18. The actuation disk 46 is free to move axially with respect to the retainer 36, so when the attractive force of the actuator 58 overcomes the force of the second biasing element 56, the actuation disk 46 will move axially toward the inner surface 40 of the case end 18 until the actuation disk 46 contacts the inner surface 40 of the case end 18. When the actuation disk 46 is brought into contact with the inner surface 40 of the case end 18, the relative rotational motion of the outer race 12 and case end 18 with respect to the actuation disk 46 will frictionally be transferred to the actuation disk 46. The actuation disk 46 is linked rotationally and circumferentially to the retainer tabs 38, therefore the rotational movement of the outer race 12 and case end 18 will be transferred through the actuation disk 46 and to the retainer 36.

Rotational movement of the retainer 36 with respect to the inner race 20 moves the rolling elements 34 along the ramped surfaces until the rolling elements 34 are no longer in the centers of the cammed surfaces. Since the gap 24 is not large enough to accommodate the diameter of the rolling elements 34, when the rolling elements 34 move out of the centers of the cammed surfaces, the rolling elements 34 become wedged between the outer surface 22 of the inner race 20 and the inner surface 14 of the outer race 12, thereby locking the inner race 20 and outer race 12 together rotationally. The ramped surfaces are designed such that when the rolling elements 34 wedge between the inner and outer races 12, 20 an angle is formed between the ramped surfaces of the inner race 20 and a line tangent to the inner surface 14 of the outer race 12. In order for the rolling elements 34 to wedge properly between the inner surface 14 of the outer race 12 and the outer surface 22 of the inner race 20, the angle defined by the ramped surfaces and a line tangent to the inner surface 14 of the outer race 12 is preferably between approximately 4 degrees and approximately 10 degrees. If this angle is too small, then the hertzian contact forces will be too high, crushing the rolling elements 34 and brinnelling the surfaces of the inner and outer races 12, 20. If the angle is too large, the rolling elements 34 will squirt out from between the inner surface 14 of the outer race 12 and the outer surface 22 of the inner race 20. The ramped surfaces and the interaction of the ramped surfaces with the rolling elements 34 are described in detail in U.S. Pat. Nos. 5,927,456 and 5,924,510 which are both assigned to NTN Corporation and are hereby incorporated by reference into this application.

In the preferred embodiment, the actuator 58 comprises an electromagnetic coil 60 held within a housing 62 mounted to an exterior surface of the stationary axle housing (not shown). The case end 18 includes a plurality of partially circumferential slots 66 extending through the case end 18 and spaced radially about the case end 18. When energized, the electromagnetic coil 60 produces a magnetic flux which is focused around the slots 66 and concentrated on the actuation disk 46. When the magnetic flux passes through the actuation disk 46, the actuation disk 46 is magnetically drawn toward the inner surface 40 of the case end 18. Once the magnetic force of the electromagnetic coil 60 overcomes the force of the second biasing element 56, the actuation disk 46 will start to move toward the inner surface 40 of the case end 18.

Preferably, the actuator 58 is an electromagnetic coil 60, however it is to be understood, that the present invention could be practiced with an actuator 58 of some other type. The actuation disk 46 could be moved through hydraulic or pneumatic means as well as through electromagnetic means. The present invention allows the actuator 58 to be mounted directly to the stationary axle housing in a drive line assembly, thereby allowing the differential to fit within existing axle carriers to make replacement cost efficient.

When the actuator 58 is de-energized, the magnetic attraction of the actuation disk 46 to the inner surface 40 of the case end 18 dissipates. As this attraction dissipates, the force of the second biasing element 56 quickly overcomes the dissipating magnetic attraction and forces the actuation disk 46 back away from the inner surface 40 of the case end 18, thereby eliminating the frictional transfer of rotation to the actuation disk 46. Without a rotational force to pull the retainer 36 and rollers 34 out of the neutral position, the first biasing element 81 will force the retainer 36 back into the neutral position and the rollers 34 back into the middle of the cammed surfaces, thereby allowing the outer race 12 to rotate freely with respect to the inner race 20, and un-locking the clutch assembly 10.

In the preferred embodiment, the actuation disk 46 includes an annular step 82 extending around the inner diameter 50 of the actuation disk 46. The annular step 82 faces the inner surface 40 of the case end 18, and provides a recess into which the second biasing element 56 is piloted and can collapse into when the actuation disk 46 is drawn to the inner surface 40 of the case end 18. Preferably, the second biasing element 56 is a wave spring that fits within the annular step 82 on the actuation disk 46 and collapses within the annular step 82 when the force of the electromagnetic coil 60 exceeds the spring force of the wave spring 56.

Preferably, the housing 62 for the electromagnetic coil 60 is mounted to the stationary axle carrier and is located with respect to the case end 18 by a bearing 68. The bearing 68 can be a ball, roller or journal bearing and will allow the electromagnetic coil 60 and the housing 62 to remain stationary with respect to the axle housing/carrier. This will allow wiring to the electromagnetic coil 60 to be simplified because an electrical connection to a rotating body is not required. A journal bearing or some other type of bearing could also be used. Any means suitable to allow relative rotational movement between the housing 62 and the exterior surface of the case end 18 is adequate.

Figure 5:
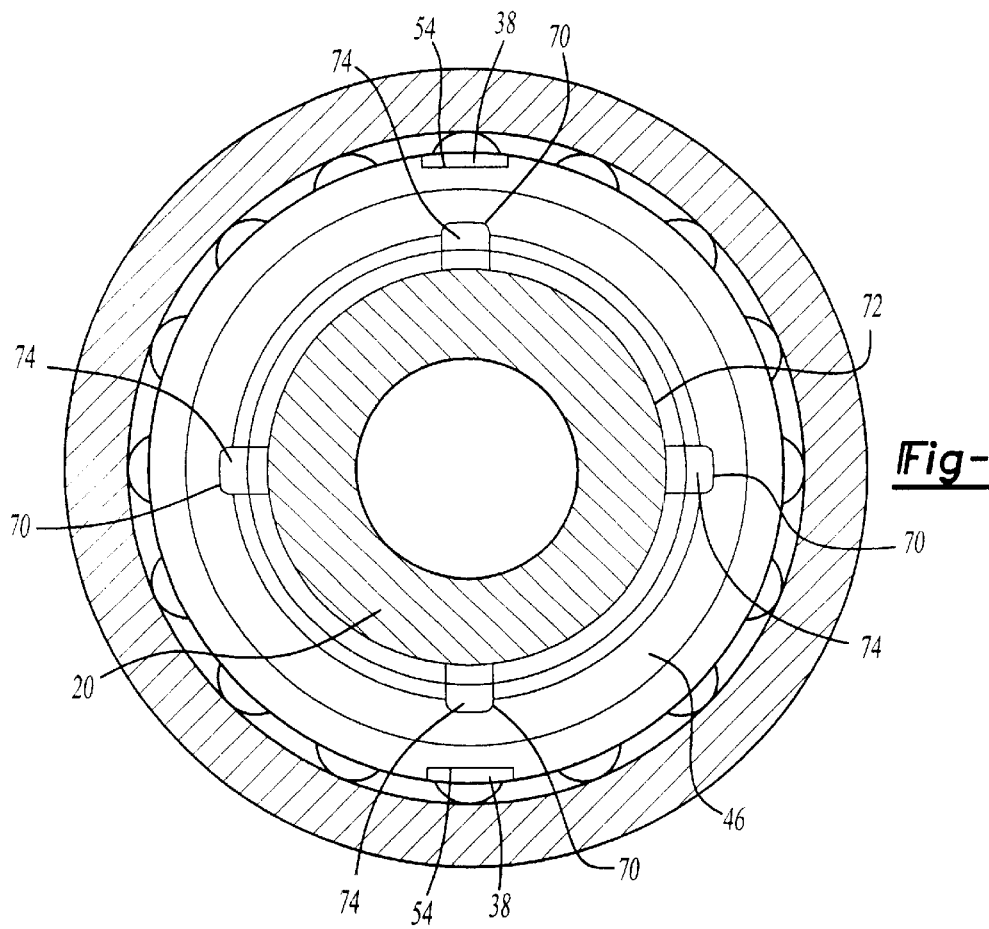
FIG. 5 is a sectional view of FIG. 1 taken along line 5—5.

Referring to FIGS. 4 & 5, in the preferred embodiment, the inner diameter 50 of the actuation disk 46 includes a series of inner notches 70. The inner race 20 includes a hub 72 adjacent the cammed outer surface 22 which includes a step 74 extending radially and axially outward. The step 74 extends axially toward the inner surface 40 of the case end 18 leaving a space 76 between the step 74 and the inner surface 40 of the case end 18. The height of the actuation disk 46 is sized to fit within that space 76 such that the step 74 engages the inner notch 70 when the actuation disk 46 is biased toward the retainer 36. This locks the actuation disk 46 rotationally to the hub 72 of the inner race 20. This is helpful to insure that the actuation disk 46 will not inadvertently rotate and cause the clutch 10 to lock up by mistake. This can happen when the viscosity of the oil within the clutch 10 and the rotational speed of the outer race 12 combine to frictionally rotate the actuation disk 46 without the actuator 58 attracting the actuation disk 46 to the inner surface 40 of the case end 18. As long as the inner notch 70 within the actuation disk 46 is engaged with the step 74 on the hub 72, the actuation disk 46 cannot rotate, and the clutch 10 cannot be inadvertently locked up.

When the electromagnetic coil 60 is actuated and draws the actuation disk 46 toward the case end 18, the notches 70 on the inner diameter of the actuation disk 46 will clear the step 74 just before coming into contact with the inner surface 40 of the case end 18, thereby allowing the actuation disk 46 to rotate freely within the space 76 between the step 74 and the inner surface 40 of the case end 18 and allowing the clutch 10 to lock up. Preferably, the step 74 is formed on the hub 72 of the inner race 20, however, it is to be understood that the step 74 could be formed on a ring 78 that is press fit onto the hub 72 of the inner race 20.

In the preferred embodiment, the retainer tabs 38 extend directly from the retainer 36, however, alternatively, the clutch assembly 10 could include an actuation spider 80 mounted to the retainer 36 as shown in FIGS. 2 and 3. The actuation spider 80 is rotationally locked to the retainer 36 such that the actuation spider 80 and the retainer 36 functionally act as one component. The first biasing element 81 acts against the retainer 36, holding the retainer in position with respect to the inner race 20. The retainer tabs 38 extend from the actuation spider 80 to engage the notches 54 within the outer diameter 48 of the actuation disk 46.

Figure 6:
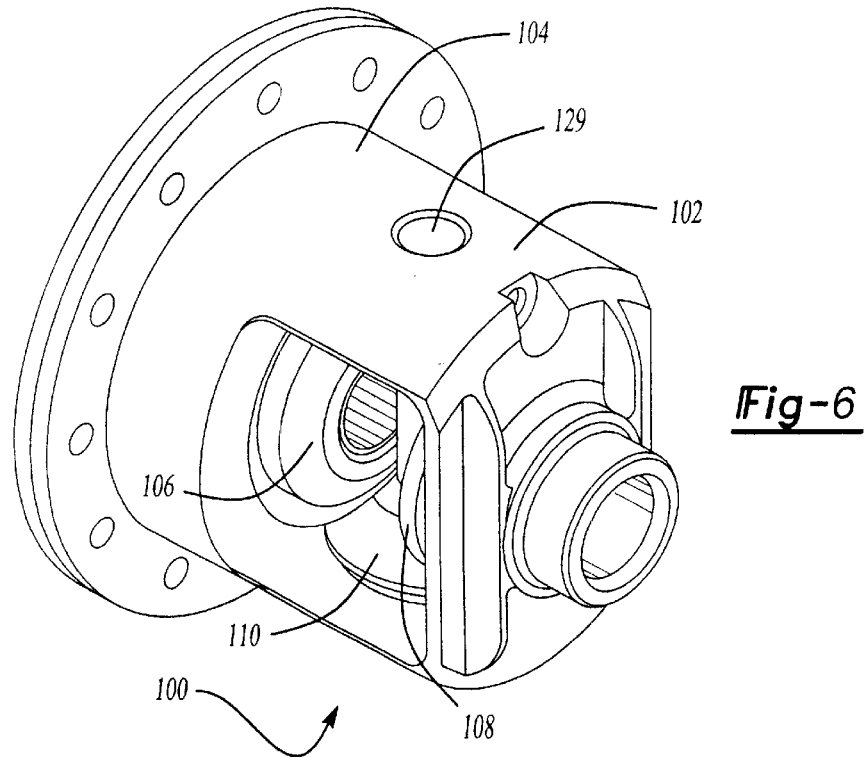
FIG. 6 is a perspective view of a differential housing with an over-running clutch of the present invention.
Figure 7:
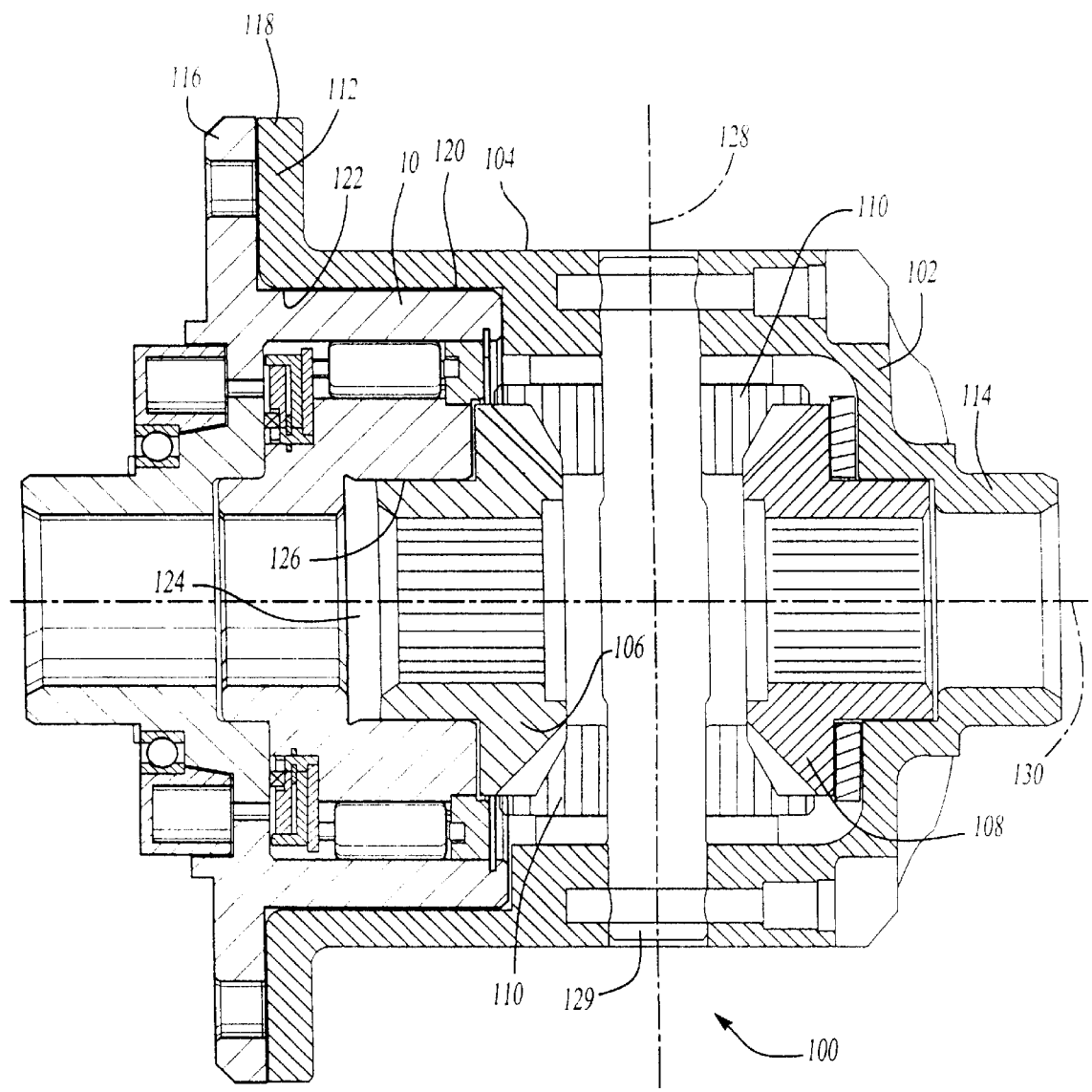
FIG. 7 is side sectional view of the differential housing of FIG. 6.

Preferably, the clutch assembly can be used within an automotive differential to lock the two axle shafts together. Referring to FIGS. 6 & 7, a differential is shown generally at 100. The differential includes a housing 102 with an input ring gear (not shown) mounted to an outer diameter 104 of the housing 102. Rotational motion from the drive train of the vehicle is transferred to the differential housing 102 through this ring gear. A first side gear 106 and a second side gear 108 are mounted within the differential housing 102 and are attached to first and second axle half-shafts (not shown) of the vehicle. Two or more spider gears 110 are mounted in the differential housing 102 so that they match with the first and second side gears 106, 108.

During normal straight line operation, the power provided is transmitted through the ring gear to the differential housing 102. Because there is no relative rotational speed differences between the two axles during normal straight line operation, the differential housing 102 and axles rotate at the same speed, and there is no relative motion between the side gears 106, 108 and the spider gears 110. When the vehicle turns, rotational speed differences between the two axles are caused by the differently sized circles being described by the tires on each side of the vehicle. As the axles turn at different speeds, side gears 106, 108 also turn at different speeds, but the spider gears 110 keep the two axles meshed together and torque is split proportionally between the two sides.

The clutch assembly 10 is mounted within the differential housing 102 to allow both the axles of the vehicle to be locked together by locking the first side gear 106 rotationally to the differential housing 102. Referring to FIG. 7, the second side gear 108 is rotatably mounted within the differential housing 102 at a second end 114. The second side gear 108 is fixed axially, but is allowed to rotate independently of the differential housing 102. The outer race/case end of the roller clutch 10 is fixedly mounted to the differential housing 102 at a first end 112.

As shown in the figure, the clutch assembly 10 and the differential housing 102 can each include a flange 116, 118 to allow them to be attached to one another with mechanical fasteners. However, it is to be understood, that an outer diameter 120 of the outer race 12 of the clutch assembly 10 and an inner diameter 122 of the first end 112 of the differential housing 102 can be formed with splines therein and sized such that the clutch assembly 10 can be press fit within the inner diameter 122 of the first end 112 of the differential housing 102 to eliminate the need for mechanical fasteners.

The first side gear 106 is fixedly mounted to the inner race 20 of the clutch assembly 10. In the preferred embodiment, the inner race 20 includes a center bore 124 and the first side gear 106 includes an outer diameter 126, wherein the center bore 124 of the inner race 20 and the outer diameter 126 of the first side gear 106 are adapted to be press fit or splined together. The center bore 124 of the inner race 20 and the center bore of the first side gear 106 may also have splines formed on them to connect each to a common spline on the first axle/half shaft, to prevent any relative rotational movement between the inner race 20 and the first side gear 106. In all of these embodiments, the first side gear 106 and the inner race 20 are locked together and functionally act as one component.

The spider gears 110 are mounted within the housing 102 and rotate about a first axis 128 defined by a shaft 129 mounted therein. The first and second side gears 106, 108 are mounted to the differential housing and rotate about a second axis 130 defined by the first and second axle half-shafts which is perpendicular to the first axis. The spider gears are mounted within the housing and on the shaft and are engaged with both the first and second side gears 106, 108.

When the clutch assembly 10 is dis-engaged, the inner race 20 and the outer race 12 are free to rotate relative to each other so the first side gear 106 and the first axle half shaft 109 are free to rotate relative to the differential housing 102. If the rotational speed of the axle half-shafts are different, such as when the vehicle turns, the side gears 106, 108 also turn at different speeds, but the spider gears 110 keep the two axles meshed together and torque is split appropriately between the two sides. In conditions of poor traction (wet roads, snow, ice), one wheel can slip and the differential 100 doesn't allow the other wheel to carry any torque. Under these conditions, a vehicle can have trouble getting up even a low grade hill.

When the clutch assembly 10 is engaged, the first axle half-shaft, the first side gear 106, the inner race 20, the outer race 12 and the differential housing 102 are all locked together so that no relative rotation is allowed. When the first side gear 106 is locked rotationally to the differential housing 102, the spider gears 110, which are meshed with the first side gear 106 are prevented from rotating around the first axis 128, and the second side gear 108, which is meshed with the spider gears 110, is prevented from rotational movement relative to the differential housing 102. To simplify, when the clutch assembly 10 is engaged, the two side gears 106, 108, and consequently the two axle half-shafts are effectively locked together so that torque is transferred to both axle half-shafts equally and no relative rotation between the two axle half-shafts is allowed.

The foregoing discussion discloses and describes one preferred embodiment of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. An over-running clutch assembly comprising:

an outer race having a cylindrical inner surface and being rotatable about an axis and a case end enclosing a first end of said outer race;

an inner race having a cammed outer surface coaxial with said cylindrical inner surface and defining a gap therebetween, said inner race being rotatable about said axis with allowable rotational movement relative to said outer race;

a hub mounted onto said inner race adjacent said cammed outer surface, said hub including a step extending radially outward, said step extending axially toward an inner surface of said case end with a gap therebetween;

a plurality of ramp surfaces formed at spaced apart locations on said cammed outer surface, said ramp surfaces defining a plurality of cammed surfaces on said outer surface;

a plurality of rollers positioned between said outer race and said inner race with each of said rollers being located in a midpoint of the cammed surfaces, said rollers having a diameter less than said gap between said cylindrical inner surface and the midpoint of said cammed outer surface;

a retainer interconnecting all of said rollers and causing said rollers to circumferentially move in unison with one another, said retainer being rotatable about said axis with limited relative rotation with respect to said inner race, said retainer including a retainer tab extending axially toward an axial inner surface of said case end, a distal end of said retainer tab being adjacent said inner surface of said case end;

a first biasing element supported on said retainer to radially bias said retainer so as to hold each of said rollers onto the midpoints of the cammed surfaces;

an actuation disk having an outer diameter, an inner diameter and a thickness, disposed between said retainer and said inner surface of said case end including a notch located radially about said outer diameter of said actuation disk, said notch adapted to engage said retainer tab thereby preventing rotational motion of said actuation disk relative to said retainer and allowing axial motion of said actuation disk relative to said retainer;

said inner diameter of said actuation disk including at least one inner notch formed therein, said thickness of said actuation disk being sized to fit within said gap between said inner surface of said case end and said step such that said step of said hub engages said inner notch when said actuation disk is biased toward said inner race to prevent rotation of said actuation disk relative to said hub and inner race, and said inner notch clears said step when said actuation disk is forced into contact with said inner surface of said case end, thereby allowing said actuation disk to rotate relative to said hub and inner race;

a second biasing element disposed between said actuation disk and said inner surface of said case end to bias said actuation disk away from said case end and toward said retainer; and an actuator to selectively overcome said second biasing element to force said actuation disk into contact with said case end, wherein rotation of said outer race and said case end with respect to said inner race is frictionally transferred to said actuation disk and said retainer, thereby moving said rollers along said ramp surfaces to a position where said rollers engage and wedge between said inner and outer races to prevent relative rotation between said inner and outer races.

2. The over-running clutch assembly of claim 1 wherein said actuator comprises an electromagnetic coil held within a housing mounted to a stationary housing and being located relative to said case end, said case end including slots spaced radially about said case end, wherein a magnetic flux is focused around said slots to said actuation disk when said electromagnetic coil is energized, thereby magnetically attracting said actuation disk toward said inner surface of said case end.

3. The over-running clutch assembly of claim 2 wherein said housing for said electromagnetic coil is located relative to said case end by a bearing to allow said case end and said outer race to rotate independently of said housing.

4. The over-running clutch assembly of claim 1 wherein said step is formed on a collar, said collar having an inner diameter and said hub having an outer diameter, said inner diameter and said outer diameter sized to allow said collar to be forced onto said outer diameter of said hub and held thereto by a press fit condition.

5. The over-running clutch assembly of claim 1 wherein said first biasing element is a centering spring held in place between said inner race and said retainer to bias said retainer into a neutral position wherein the rollers are held at said midpoint of said cammed surfaces on said inner race.

6. The over-running clutch assembly of claim 1 wherein said actuation disk further includes a recess on an axial face of said actuation disk and said second biasing element is a wave spring resting within said recess, said recess providing a cavity into which said wave spring compresses when said actuation disk is forced into contact with said inner surface of said case end.

7. The over-running clutch assembly of claim 6 wherein said actuation disk further includes grooves formed therein to assist in displacement of lubricant.

8. An over-running clutch assembly comprising:

an outer race having a cylindrical inner surface and being rotatable about an axis and a case end enclosing a first end of said outer race;

an inner race having a cammed outer surface coaxial with said cylindrical inner surface and defining a gap therebetween, said inner race being rotatable about said axis with rotational movement relative to said outer race;

a plurality of ramp surfaces formed at spaced apart locations on said cammed outer surface, said ramp surfaces defining a plurality of cammed surfaces on said cammed outer surface;

a plurality of rollers positioned between said outer race and said inner race with one of said rollers being located at a midpoint of each of said cammed surfaces, said rollers having a diameter less than said gap between said cylindrical inner surface and said cammed outer surface;

a retainer interconnecting all of said rollers and causing said rollers to circumferentially move in unison with one another, said retainer being rotatable about said axis with limited relative rotation with respect to said inner race, said retainer including a retainer tab extending axially toward an axial inner surface of said case end, a distal end of said retainer tab being adjacent said axial inner surface of said case end;

a first biasing element supported on said retainer to radially bias said retainer with respect to the inner race to hold each of said rollers at said midpoints of said cammed surfaces;

an actuation disk having an outer diameter, an inner diameter and a thickness, disposed between said retainer and said axial inner surface of said case end including a notch located radially about said outer diameter of said actuation disk, said notch adapted to engage said retainer tab thereby preventing rotational motion of the actuation disk relative to the retainer and allowing axial motion of the actuation disk relative to the retainer;

a second biasing element disposed between said actuation disk and said inner surface of said case end to bias said actuation disk away from said case end and toward said retainer;

a housing mounted to an interior surface of an axle housing and a bearing to locate said housing relative to an exterior surface of said case end, said housing being supported by said bearing to allow said case end and outer race to rotate independently of said housing;

an electromagnetic coil held within said housing, said case end including slots spaced circumferentially about said case end, said electromagnetic coil selectively providing a magnetic flux focused around said slots to said actuation disk, thereby magnetically attracting said actuation disk toward said axial inner surface of said case end to overcome said second biasing element and force said actuation disk into contact with said case end, wherein rotation of said outer race and case end with respect to said inner race is frictionally transferred to said actuation disk and said retainer, thereby moving said rollers along said ramp surfaces to a position where said rollers engage and wedge between said inner and outer races to prevent relative rotation between said inner and outer races;

said inner diameter of said actuation disk including at least one inner notch formed therein and said inner race including a hub adjacent said cylindrical outer surface, said hub including at least one step extending radially outward, said step extending axially toward said inner surface of said case end with a gap therebetween, said thickness of said actuation disk being sized to fit within said gap such that said step engages said inner notch when said actuation disk is biased toward said retainer to prevent rotation of said actuation disk relative to said hub and inner race, and said inner notch clears said step when said actuation disk is forced into contact with said inner surface of said case end allowing said actuation disk to rotate relative to said hub and inner race.

* * * * *